Dec. 30, 1958  A. J. SNIVELY  2,866,480
TUBING MADE FROM STRIP METAL STOCK
Original Filed July 12, 1950
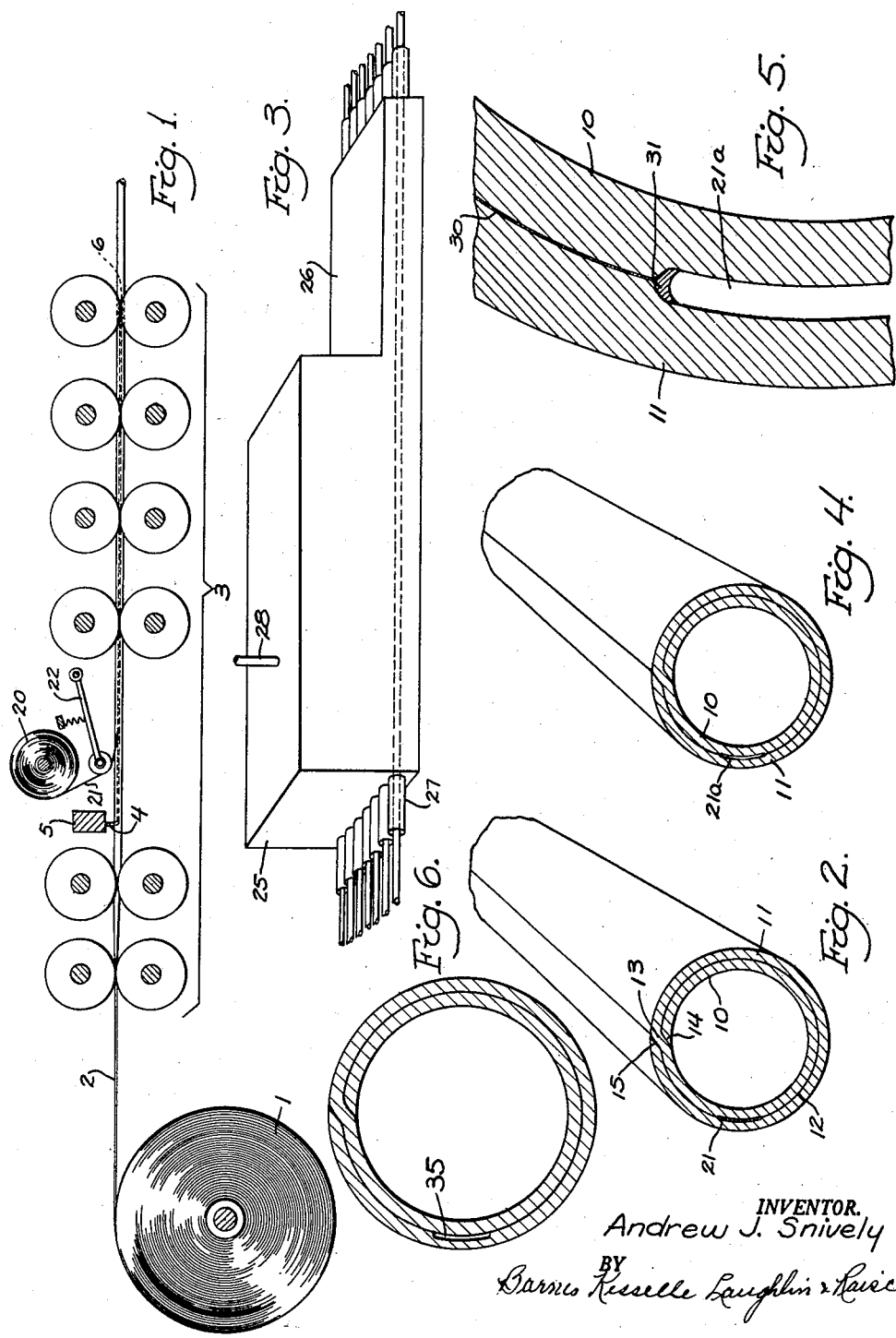
INVENTOR.
Andrew J. Snively
BY
Barnes, Kisselle, Laughlin & Raisch
Attorneys.

United States Patent Office 2,866,480
Patented Dec. 30, 1958

2,866,480

TUBING MADE FROM STRIP METAL STOCK

Andrew J. Snively, Bloomfield Township, Oakland County, Mich., assignor to Bundy Tubing Company, Detroit, Mich., a corporation of Michigan Original application July 12, 1950, Serial No. 173,295, now Patent No. 2,620,022, dated October 11, 1955. Divided and this application August 16, 1955, Serial No. 528,626

5 Claims. (Cl. 138—74)

This invention relates to tubing made from strip metal stock which is fashioned into tubular form with overlapping portions, the interfaces of which are bonded together to provide a fluid tight tubing. This application is a division of application Serial No. 173,295 filed July 12, 1950, now Patent Number 2,720,022 dated October 11, 1955.

The invention is concerned more particularly with tubing made from a single strip of bare metal stock wherein the bonding metal, in the form of a ribbon, is incorporated within the wall of the tubing as the strip is fashioned into tubing with continuous longitudinal movement. Subsequently, the tubing thus formed, with the bonding metal incorporated therein, is subjected to a heat treatment for melting the bonding metal. The bonding metal thus constitutes a reservoir which, upon becoming molten, supplies all requirements for bond metal for uniting the plies and the seam. The bonding metal, when molten, flows from the reservoir and fills in between the interfaces of the plies and seam to unite the same.

Among the objects of the invention is the provision of good strong tubing which can be produced at lower manufacturing costs on a production basis day in and day out with an exceedingly high percentage of good quality tubing thus eliminating wastefulness due to rejected tubing because of imperfections.

A further object of the invention is to produce tubing wherein the inside and outside surfaces are constituted by clean exposed surfaces of the bare strip stock of which the tube is made.

Other objects and advantages of the invention will become apparent as the following detailed description is considered.

Fig. 1 is a diagrammatic view illustrating a tube mill by which the tubing can be made in accordance with the invention.

Fig. 2 is an enlarged cross sectional view of the tubing after it is initially formed and while still in the cold state.

Fig. 3 is a view illustrating a furnace for heat treating the tubing.

Fig. 4 is a cross sectional view similar to Fig. 2 illustrating the finished tube after the heat treatment.

Fig. 5 is an enlarged partial cross sectional view showing the seam of the completed tubing.

Fig. 6 is an enlarged sectional view of a tube illustrating a modified form.

In considering the invention attention may first be given to the materials involved. Inasmuch as tubing fashioned from strip steel stock and sealed and bonded with copper is the type of tubing most used for general purposes, the invention will be disclosed with reference to these materials. The steel referred to may be a rather common carbon steel and the copper may be commercially pure copper. However, cuprous alloys, such as a form of bronze or brass, or a soldering compound may be used as a bonding metal with the steel strip, and strip other than steel, as for example Monel, may be used as the tube forming material, in which event a suitable bonding metal may be selected for the best or desired performance with strip other than steel.

Also in considering the invention it is believed that reference to the method by which the tubing is produced will be helpful. As the tubing is being formed a ribbon of copper is placed between the steel plies of a double walled tubing. Thus, the copper is originally furnished in a solid form, continuous for the length of the tubing. The copper is located between the plies so that upon becoming molten it quickly flows between the interfaces of the steel. It is important that the dimensions of the ribbon be properly selected with reference to the size of the tubing involved and the amount of copper required to completely unite all portions of the interfaces. This is because a void or cavity remains in the tube wall after the molten copper has flowed from the reservoir.

The copper ribbon thus embodied between the inner and outer plies constitutes a reservoir which supplies molten copper to the interfaces of the plies and seams. Upon becoming molten the copper flows quickly from the reservoir and completely fills in between the interfaces. This action occurs by capillarity. The spacing between the interfaces is less than the cross dimension of the reservoir and thus flow by capillarity is promoted. Regardless of how tightly the interfaces are seated against each other, there is some space therebetween, and the tighter the plies are wrapped together the better because the molten copper seeks to flow into small spaces. It has been found that the limit of the capillary action of molten copper is about .004 of an inch. When the copper flows from the reservoir and in between the interfaces, it will not flow out of the seam. The flow stops at the peripheral surface of the tubing, thus securely uniting the interfaces completely unto the interior and exterior surfaces of the tubing. This capillary action occurs even though the dimension across the reservoir may be near or partly within the capillary limit of .004" because, even in a poorly wrapped tubing, that is, a tubing where the plies are not tightly compacted together, the spacing between the interfaces of the plies and in the seam is less than the cross dimension of the reservoir cavity.

By reference to Fig. 1, it will be seen that the strip steel stock may be in the form of a coil 1 from which the strip 2 is drawn and passed through a tube mill which has a plurality of forming rollers. Such tube mills are well known to those versed in the art and suffice it here to indicate the tube mill generally by reference character 3. A mandrel 4, held by a suitable support 5, is introduced into the tubing while the strip is still open and this mandrel has an end portion 6 positioned between a pair of opposing rollers of the tube mill to tightly compress the tube wall.

The tubing of the present invention, insofar as its structure is concerned, is illustrated in Fig. 2. The strip is fashioned through substantially 720° to provide an inner ply 10, and an outer ply 11 with the interfaces of the plies in substantial contact, as shown at 12. An intermediate portion of the strip is offset, preferably in an angular manner, as shown at 13, and the edges of the stock abut the opposite faces of the offset as shown at 14 and 15. The edge portions are preferably of bevelled formation to nicely fit against the offset. For convenience, this portion of the tubing namely, that portion constituted by the offset and the oppositely disposed abutting edges of the strip may herein be termed the seam. Tubing of this general construction fashioned from copper coated strip steel with the copper coating appearing both inside and outside the tube and with the plies and seam bonded by the copper has been produced in great quantities throughout the past years and no further detailed explanation of this tube structure is believed to be necessary. The method of making the tubing from copper coated strip is shown in the Bundy Patent No. 1,892,607 of December 27, 1932, and one way of fashioning the strip is shown in the Woeller Patent No. 2,292,810 of August 11, 1942.

Referring again to Fig. 1, it will be noted that there is a coil 20 of copper ribbon. The ribbon 21 is drawn from this coil and fed into the tubing as it is being formed. The ribbon may be passed over a suitable tension maintaining device 22. As illustrated in Fig. 2, the ribbon 21 is positioned between the plies 10 and 11 and located so that it does not fall within the seam. Advantageously, the ribbon may be located about 90° from the seam although it may be located any place removed from the seam. The tubing shown in Fig. 2 illustrates the same with the ribbon in position as the tubing comes from the forming mill. The ribbon is engaged and gripped by the plies of the tubing so that as the tube moves longitudinally it pulls the ribbon from the coil. Thus, the formed tube and the ribbon between the plies thereof both move longitudinally uniformly relative to each other.

With the tubing thus formed it may be cut into relatively long lengths and then given its heat treatment. A furnace 25 with an adjoining cooler 26 having a plurality of guide pipes 27 passing therethrough is shown in Fig. 3, and several lengths of the tubing, as illustrated, may be passed simultaneously through the furnace and cooler. Preferably, a non-oxidizing or reducing atmosphere is maintained in the furnace and the same may be introduced therein through an inlet pipe 28 and the gas may burn off at the inlet end of the furnace. This form of furnace for the heat treatment is preferred.

The temperature given to the tubing in the furnace is sufficient to melt the copper and the finished tube is as indicated in Fig. 4. The heating of the tubing should be such that every increment of the copper ribbon throughout the length of the tubing is melted. The copper ribbon 21 has melted and there is a resultant void or cavity 21a running lengthwise in the wall of the tubing. This is shown in an enlarged manner in Fig. 5. Also in Fig. 5 the copper bond is indicated at 30. This copper bond is actually shown with a thickness greater than that which it has in practice. In some instances, all of the copper may not leave the reservoir and some remaining copper is indicated at 31. In such instances the reservoir forms a repository for the excesses of copper which are not required to fill the interfaces between the plies.

With the form of apparatus above described, the tubing wall structure is subjected to pressure between the mandrel and forming rolls and some of the metal of the strip is displaced thus forming the cavity containing the ribbon. Indeed, the ribbon may be thinned somewhat by the pressure. In the form shown in Fig. 6, the strip stock is formed with a groove 35. This may be done in a well known manner by forming rolls in the tube mill. Thus the metal of only one ply is thinned. In making the tube the ribbon is fed into the groove 35 with sufficient engagement and frictional grip to pull the ribbon from a coil thereof.

In making the tubing the bare steel interfaces can be brought into direct contact thus providing a space of minute dimensions between the plies. This is advantageous because, as aforesaid, the molten copper seeks to flow into the narrow space and it might be said that the smaller the space or the tighter the plies are compacted together, the better. The preferred and ideal situation is to provide adequate copper in the reservoir to completely fill the demand for copper between the plies and in the seam. This amount of copper need not be controlled with delicate precision because if there is excess copper it remains in the void. The molten copper will flow between the plies and fill in between the interfaces in the seam but will not flow out of the seam either inside or outside the tube.

Inasmuch as the ribbon is incorporated in solid form, in the wall structure of the tubing, the metal of the strip must accommodate the same. As shown in Fig. 5, the metal of the plies of the strip is displaced thus forming the cavity for the ribbon and this displacement may take place on both inner and outer plies. The preformed groove, as shown in Fig. 6, provides a cavity in the metal of only one of the plies. The groove is preferably preformed to substantially conform to the shape and dimensions of the ribbon, to the end that the resultant cavity is not substantially larger than that necessary to contain the required amount of copper.

The ribbon dimensions are important. The size of the ribbon should be predetermined, with due reference to the size of the tube, and the use to which it is to be put so that the wall at the void substantially retains the critical strength and working properties of the double wall. The thinning of the metal of the wall of the tube at the void tends to decrease the internal bursting pressure, but with the double ply wall, and with a ribbon of proper dimensions the critical value may be retained and the small reduction is inconsequential. The circumferential extent of the void, which is determined by the width of the ribbon, may, if too great, tend to cause a slight wrinkling of the tube wall when the tube is subjected to severe working operations. An example of excellent tubing is as follows: Tubing having an outside diameter of ¼″ fashioned from steel strip stock of .014″ in thickness to provide a wall of .028″ in thickness, with a copper ribbon of from .050 to .060 in width and about .0055 in thickness. The tube of this example was satisfactory in every respect and for all purposes in as much as the dimensions of the resultant void were such as to not lessen the quality of the tube in any critical manner. Thus it will be seen that the resultant void or cavity has a circumferential dimension which does not exceed substantially one-fourth of the diameter of the tubing, and a radial dimension does not exceed substantially one-fifth of the thickness of the wall, and this is preferred. The thinned metal of one or both plies define and bridge the cavity. The size of the cavity is preferably determined by the cross dimensions of the ribbon, and where the thinned metal of the plies bridge a cavity substantially of the above proportions, the critical strength and working properties of the double wall of the tube is substantially maintained.

Numerous advantages and unexpected results occur in the making of the tubing. There is an overall economy in the fact that production runs may operate day in and day out with an exceedingly high percentage of good tubing and an absolute minimum of defective tubing. All that is necessary with a properly fashioned tubing is to make sure that the copper in the reservoir is melted and there is just one place for the copper to go and that is in between the interfaces of the plies and seam. There is a substantial saving because the strip stock does not have to be coated with the bonding metal which is an expensive procedure. The tolerances of the strip do not have to be maintained so closely; for example, the strip stock unavoidably varies along its length as to width and thickness and these variations result in the plies being more tightly compacted in some locations than in other locations. By providing adequate copper in the reservoir the copper fills in between and seals the plies and the seam where not so tightly compacted. So, it will be seen that good tubing can be made from strip stock which is not so precisely held to close tolerances as was heretofore necessary. This, of course, reduces the cost of the strip and the cost of the resultant tubing. Also, there is a saving in the amount of copper used. With the double walled tubing as shown, the copper required is about ⅓ of what is required to make the tubing from copper coated strip. Moreover, the extreme edge portions of the seam or seams, where they merge with the inner and outer surfaces of the tubing, are securely bonded together with no burr or protrusion and with no open or unsealed portions because the copper flows up to the surfaces of the tubing and stops flowing at that location.

Still further, a tubing may be provided with clean exposed steel surfaces both inside and out. This is desirable for some uses where copper or other bonding metal must be eschewed. Of course, a thin line of copper is present at the seam both inside and outside the tubing, but, where this is subject to attack by the fluids with which the tubing may be used, the attack occurs only for a very limited distance within the seam and then ceases. Of course, the finished tube may be coated or plated with other metal, such as tin or tin and lead alloy if desired.

The invention is especially directed to, and is applicable to, tubing fashioned from a single strip of stock with a double thickness wall. A tube thus formed definitely has a double wall formation throughout its circumference and therefore the strength of the tube is determined by the double wall. This differentiates from tubing made from two strips wherein the plies may not be in tight engagement and which, at some locations, unavoidably has a gap between the edges of the inner ply or the outer ply and therefore only a wall of single thickness at the gap.

Notwithstanding the presence of the reservoir void, the tubing of the present invention definitely has a double wall formation throughout its circumferential extent. In addition, there is assurance that the interfaces of the plies and seam are bonded together throughout, except at the location of the reservoir void. It might be said that a concession is made in the presence of the reservoir void in order to obtain an unfailing bond of the interfaces. But overall conditions are improved. Faults and defects in the bond of the interfaces are practically eliminated. This is highly desirable because otherwise such faults and defects have great non-uniformity and cannot be determined in advance. As against this, the characteristics caused by the presence of the reservoir void are very uniform and can be controlled and determined in advance. This is highly desirable, particularly when it is considered that the tubing is made on a production basis with assurance of a good bond between all the interfaces.

While the invention has been disclosed with reference to using only one ribbon of bonding material, it is within the invention to use two or more ribbons, but the use of one ribbon is generally preferred. However, for example, where it is the desire to make tubing with working properties suitable for some severe working conditions, it may be desirable to reduce the circumferential extent of the void, particularly in a tubing of larger diameter. This may be done by using two ribbons spaced circumferentially of the tubing and each having a width about ½ of the width of a single ribbon for supplying the same amount of copper and assuming that the thickness remains unchanged. Thus while there are two resultant voids, the circumferential extent of each is proportionately reduced.

In some cases where the tubing is drawn for reduction purposes, and particularly where it is drawn through a die and over a mandrel, the void may be partially or substantially closed, but it is considered to still exist insofar as the herein disclosure and claims are concerned since even though it be substantially closed there is no bond. The ribbon of bonding metal is referred to throughout the specification and some of the claims as being of copper. When the term "copper" is thus used in the claims, it is used in a broad sense and is intended to cover not only commercially pure copper but other metals and alloys containing copper.

I claim:

1. A tubing comprising, a single strip of metal stock fashioned through substantially 720° into hollow cross sectional form with inner and outer plies disposed in interfacial relationship, the strip having an offset in an intermediate portion, the opposite edges of the strip being disposed in interfacial relationship with opposite sides of the offset thereby providing a seam, the interfaces of the plies and the interfaces of the offset and said edges being secured together by a bonding metal having a melting point lower than that of the metal of the strip and having capillary thickness, said tubing having between its plies at a location circumferentially removed from the seam a repository for excess bonding metal extending lengthwise throughout the length of the tubing, said repository having a radial dimension which is greater than said capillary thickness of said bonding metal, said repository having a circumferential dimension, said radial dimension of said repository being such a small portion of the thickness of the tubing wall thereat and said circumferential dimension being such a small portion of the tubing circumference that the tubing wall has substantially the critical strength and working properties of the double thickness wall.

2. The tubing defined in claim 1 wherein said radial dimension of said repository does not exceed substantially ⅕ of the thickness of the tubing wall and said circumferential dimension does not exceed substantially ¼ the diameter of the tubing.

3. The tubing defined in claim 1 wherein at least one of said plies has a section of relatively thin metal incident to a recess in its interface, which cooperates with the opposing surface of the other ply to define said repository, said repository intersecting the interfaces between the plies.

4. The tubing as recited in claim 1 characterized in that both plies have a section of relatively thin metal incident to recesses in their interfaces, said thin sections being opposite each other so that the respective recesses are in facing relationship and define the said repository, said repository intersecting the interfaces between the plies.

5. The tubing as recited in claim 1 characterized in that the single strip is ferrous metal and the bonding metal is copper.

References Cited in the file of this patent

UNITED STATES PATENTS

| | | |
|---|---|---|
| 1,909,501 | Quarnstrom | May 16, 1933 |
| 2,092,018 | Quarnstrom | Sept. 7, 1937 |
| 2,104,884 | Quarnstrom | Jan. 11, 1938 |